US007991199B2

(12) United States Patent
Das

(10) Patent No.: US 7,991,199 B2
(45) Date of Patent: Aug. 2, 2011

(54) OBJECT IDENTIFICATION AND VERIFICATION USING TRANSFORM VECTOR QUANTIZATION

(75) Inventor: Amitava Das, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 1008 days.

(21) Appl. No.: 11/771,879

(22) Filed: Jun. 29, 2007

(65) Prior Publication Data

US 2009/0003660 A1    Jan. 1, 2009

(51) Int. Cl.
*G06K 9/00* (2006.01)
(52) U.S. Cl. ........................................ 382/115; 382/118
(58) Field of Classification Search .................. 382/115, 382/118, 159, 181, 197, 209, 218, 224
See application file for complete search history.

(56) References Cited

U.S. PATENT DOCUMENTS

| | | | |
|---|---|---|---|
| 5,802,208 | A | 9/1998 | Podilchuk et al. |
| 6,549,899 | B1 | 4/2003 | Tennenbaum et al. |
| 6,968,092 | B1 | 11/2005 | Winger |
| 7,050,607 | B2 | 5/2006 | Li et al. |
| 2003/0169908 | A1 | 9/2003 | Kim et al. |
| 2004/0170305 | A1 | 9/2004 | Kim et al. |
| 2005/0018925 | A1 | 1/2005 | Bhagavatula et al. |
| 2006/0088207 | A1 | 4/2006 | Schneiderman |
| 2006/0140455 | A1 | 6/2006 | Costache et al. |
| 2006/0170769 | A1 | 8/2006 | Zhou |
| 2009/0196464 | A1* | 8/2009 | Dimitrova et al. ............ 382/118 |

OTHER PUBLICATIONS

"The 2002 SuperSID Workshop on Speaker Recognition", *The Center for Language and Speech Processing*, Oct. 24, 2003. <http:www.clsp.jhu.edu/ws2002/groups/supersid/>.
"Vector Quantization", Data-Compression.com. <http://www.data-compression.com/vq.html> [Last Accessed: Jan. 31, 2007].
Aggarwal, et al. "A System Identification Approach for Video-based Face Recognition", *Proceedings of ICPR*, 2004. pp. 23-26.
Buik, et al. "Face Recognition from Multi-Pose Image Sequence", *Proceedings of 2nd International Symposium on Image and Signal Processing*, 2001. pp. 319-324.
Burnelli, et al. "Person Identification Using Multiple Cues", *IEEE Transactions on Pattern Analysis and Machine Intelligence (PAMI)*, vol. 17, No. 10, Oct. 1999. pp. 955-966.
Chibelushi, et al. "A Review of Speech Based Bimodal Recognition", *IEEE Transactions on Multimedia*, vol. 4, No. 1, Mar. 2002. pp. 23-37.
Das, et al. "Audio-Visual Biometric Recognition by Vector Quantization", *IEEE International Workshop on Spoken Language Technology*, Aruba, Dec. 2006, to Appear.

(Continued)

*Primary Examiner* — Daniel Mariam
(74) *Attorney, Agent, or Firm* — Perkins Coie LLP

(57) ABSTRACT

An identification system uses mappings of known objects to codebooks representing those objects to identify an object represented by multiple input representations or to verify that an input representation corresponds to an input known object. To identify the object, the identification system generates an input feature vector for each input representation. The identification system then accumulates for each known object the distances between the codebook of that object and each of the input feature vectors. The distance between a codebook and a feature vector may be the minimum of the distances between the code vectors of the codebook and the feature vector. The identification system then selects the object with the smallest accumulated distance as being the object represented by the multiple input representations.

20 Claims, 8 Drawing Sheets

OTHER PUBLICATIONS

Das, et al. "Face Recognition from Images with High Pose Variations by Transform Vector Quantization", *Computer Vision, Graphics and Image Processing*. vol. 4338-2006, *Lecture Notes in Computer Science*, Springer Berlin Heidelberg. Copyright 2006, pp. 674-685.

Das, et al. "Text-dependent speaker recognition: A survey and state of the art", *2006 IEEE International Conference on Acoustics, Speech, and Signal Processing (ICASSP)*, May 14-19, 2006, Toulouse, France.

Das. "Speaker Recognition by Text Dependent Vector Quantization with Password Conditioning", Microsoft Research—India. Bangalore, India. 2007.

Gersho, Allen, and Gray, Robert M. *Vector Quantization and Signal Compression*. Springer, 1992. 760 pgs.

Gong, et al. "Tracking and Recognition of Face Sequences", European Workshop on Combined Real and Synthetic Image Processing for Broadcast and Video Production, 1994.

Hafed, et al. "Face Recognition Using the Discrete Cosine Transform", *International Journal of Computer Vision*, vol. 43, Issue 3, Jul./Aug. 2001. pp. 167-188.

Howell, et al. "Towards Unconstrained Face Recognition from Image Sequences", *Proceedings of The International Conference on Automatic Face Recognition*, 1996. 224-229.

Kanak, et al. "Joint Audio Video Processing for Biometric Speaker Identification", *Proceedings MMUA-06*, May 2006.

Kinnunen, et al. "Real-Time Speaker Identification and Verification", *IEEE Transactions on Audio, Speech and Language Processing*, vol. 14, No. 1, Jan. 2006.

Kinnunen, et al. "Speaker Discriminative Weighting Method for VQ-Based Speaker Identification", *Proceedings AVBPA 2001*, pp. 150-156, Halmstad, Sweden, 2001.

Kittler, et al. "Combining Evidence in Multimodal Personal Identity Recognition Systems", *Proceedings of the International Conference on Audio- and Video-Based Biometric Person Authentication*, Crans Montana, Switzerland, 1997.

Krueger, et al. "Exemplar-based Face Recognition from Video", *Proceedings of ECCV*, 2002. pp. 732-746.

Lee, et al. "Video-based face recognition using probabilistic appearance manifolds", *Proceedings of IEEE Computer Society Conference on Computer Vision and Pattern Recognition (CVPR '03)*, vol. 1, pp. 313-320.

Li, et al. "Automatic Verbal Information Verification for User Authentication", *IEEE Transactions on Speech and Audio Processing*, vol. 8, No. 5, Sep. 2000.

Li, et al. "Support Vector Regression and Classification Based Multi-View Face Detection and Recognition", 2000 (6 pages).

Li, et al. "Video-Based Online Face Recognition Using Identity Surfaces", Technical Report, Queen Mary, University of London. 2001.

Matsui, et al. "A Text-Independent Speaker Recognition Method Robust Against Utterance Variations", *Proceedings of the International Conference on Acoustics, Speech, and Signal Processing, (ICASSP)1991*. ICASSP-91., 1991 pp. 377-380. ISBN:0-7803-0003-3.

Moghaddam, et al. "Face Recognition using View-Based and Modular Eigensspaces", *Automatic Systems for the Identification and Inspection of Humans*, SPIE vol. 2277, Jul. 1994.

Phillips, et al. "Face Recognition Vendor Test 2002: Evaluation Report", Technical Report NISTIR 6965, Mar. 2003. <http://www.frvt.org>.

Podilchuk, et al. "Face Recognition Using DCT-Based Feature Vectors", May 1996 (4 pages).

Ramasubramanian, et al. "Text-Dependent Speaker-Recognition Using One-Pass Dynamic Programming", *Proceedings ICASSP '06*, Toulouse, France, May 2006.

Rao, K.R., Yip, Patrick, Britanak, Vladimir. *Discrete Cosine Transform—Algorithms, Advantages, Applications*. Academic Press Professional, Inc., 1990. San Diego, CA, USA.

Soong. "A Vector Quantization Approach to Speaker Recognition", *Acoustics, Speech, and Signal Processing, IEEE International Conference on ICASSP '85*. </xpl/RecentCon.jsp?punumber=8361>. Publication Date: Apr. 1985. vol. 10, pp. 387-390 Posted online: Jan. 29, 2003 10:25:51.0.

Turk, et al. "Eigenfaces for Recognition", *Journal of Cognitive Neuroscience*, 3(1). 1991 pp. 71-86.

Yang, et al. "Detecting Faces in Images: A Survey", *IEEE Transactions on Pattern Analysis and Machine Intelligence (PAMI)*, vol. 24, No. 1, Jan. 2002. 34-58.

Yilmaz, et al. "Automatic Feature Detection and Pose Recovery for Faces", *ACCV 2002: The 5th Asian Conference on Computer Vision*, Jan. 23-25, 2002 (8 pages).

Zhao, et al. "Face Recognition: A Literature Survey," *ACM Computing Surveys*, pp. 399-458, 2003. (Also appeared as UMD Technical Report, CS-TR4167. <ftp://ftp.cfar.umd.edu/TRs/FaceSurvey.ps.gz> 2000. Revised 2002, CS-TR4167R.

Zhou, et al. "Image-Based Face Recognition under Illumination and Pose Variations", *Journal of the Optical Society of America A*, vol. 22, Iss. 2, Feb. 2005. pp. 217-229.

Zhou, et al. "Probabilistic recognition of human faces from video", *Computer Vision and Image Understanding*, vol. 91. (2003) 214-215.

\* cited by examiner

OBJECT IDENTIFICATION AND VERIFICATION USING TRANSFORM VECTOR QUANTIZATION

CROSS-REFERENCE TO RELATED APPLICATION(S)

The present application is related to U.S. patent application Ser. No. 11/771,794 entitled "SPEAKER RECOGNITION VIA VOICE SAMPLE BASED ON MULTIPLE NEAREST NEIGHBOR CLASSIFIERS," which is being filed concurrently and which is hereby incorporated by reference in its entirety.

BACKGROUND

Many applications rely on the ability to identify an object from a representation of the object or to verify whether a representation of an object corresponds to an object as purported. These applications may include authentication systems, image-based search engines, identity systems, and so on. An authentication system attempts to verify that a person who purports to be a certain person is really that certain person. An image-based search engine may try to locate duplicate or similar images to an input image. For example, a user who wants to know information about a flower may provide a picture of the flower to the search engine. The search engine may search a database that maps images of flowers to their names. When an image matching the picture is found, the search engine may provide the corresponding name to the user. As another example, a medical service provider may want to verify that a diagnosis based on a certain image (e.g., x-ray) is consistent with a data store of previous diagnoses based on images. An identity system attempts to identify the person in an image or video or the person from whom a voice sampling was obtained.

An authentication system may authenticate a user using voice recognition techniques, face recognition techniques, or other biometric recognition technique. When using voice recognition, an authentication system compares a previous sampling of a person's voice to a current sampling of a person's voice to determine whether the person who supplied the current sampling is the same person who supplied the previous sampling. Similarly, when using face recognition, an authentication system compares a previous image of a person's face to a current image of a person's face to determine whether previous image and the current image are of the same person. If the persons are the same, then the authentication system verifies that the person who provided the current voice sampling or the person in the current image is the same person who provided the previous voice sampling or who is in the previous image.

Many face recognition techniques have been proposed that attempt to recognize the person whose face is in an image even when the faces have different poses. For example, one pose may be a typical portrait pose and another pose may be with the face turned 45 degrees. Holistic face recognition techniques, such as the principal component analysis ("PCA") based Eigenface technique, perform well for image sets where pose variation is minimal, but perform poorly when there is a wide range of pose variations. Such techniques may not even perform well with minimal pose variation if there is a wide variation in facial expressions. The facial expression may include smiling, grimacing, surprised, sad, and so on. Some face recognition techniques improve their performance by attempting to normalize the variations in poses. Other face recognition techniques improve their performance by using a video of the face or sequence of images of the face, rather than a single image. However, such techniques are complex both computationally and in storage requirements.

Many voice recognition techniques that attempt to identify the speaker of a voice sampling have also been proposed. Some voice recognition systems are text-independent in the sense that a person can say any sequence of words both when training the recognition system and when providing a voice sampling for recognition. Since a text-independent voice recognition system does not have the corresponding text, it bases its models on a division of the samplings into utterances. Since utterances from different speakers who say different things may sound similar, it can be difficult for a text-independent voice recognition system to correctly identify a speaker. Although text-dependent speaker recognition systems have the advantage of knowing what words the speaker is speaking, such systems typically require larger amounts of training data and are more complex that text-independent speaker recognition systems.

SUMMARY

An identification system uses mappings of known objects (e.g., persons) to codebooks representing those objects to identify target object represented by multiple target representations (e.g., images). To identify the target object, the identification system generates a target feature vector for each input representation. The identification system then accumulates for each known object the distances between the codebook of that object and each of the target feature vectors. The distance between a codebook and a feature vector may be the minimum of the distances between the code vectors of the codebook and the feature vector. The identification system then selects the object with the smallest accumulated distance as being the object represented by the multiple input representations.

The identification system may also use the mappings of known objects to codebooks representing those objects to verify that a target representation corresponds to a target object. The identification system generates a target feature vector for the target representation. The identification system then sets a target distance to the distance between the target feature vector and the codebook for the target object. The identification system then calculates for each other known object the distance between the codebook for that object and the target feature vector. The identification system then determines whether the target distance and the minimum of the distances for the other objects (a non-target distance) satisfies a verification criterion. If so, the identification system indicates that the target object can be verified as corresponding to the target representation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
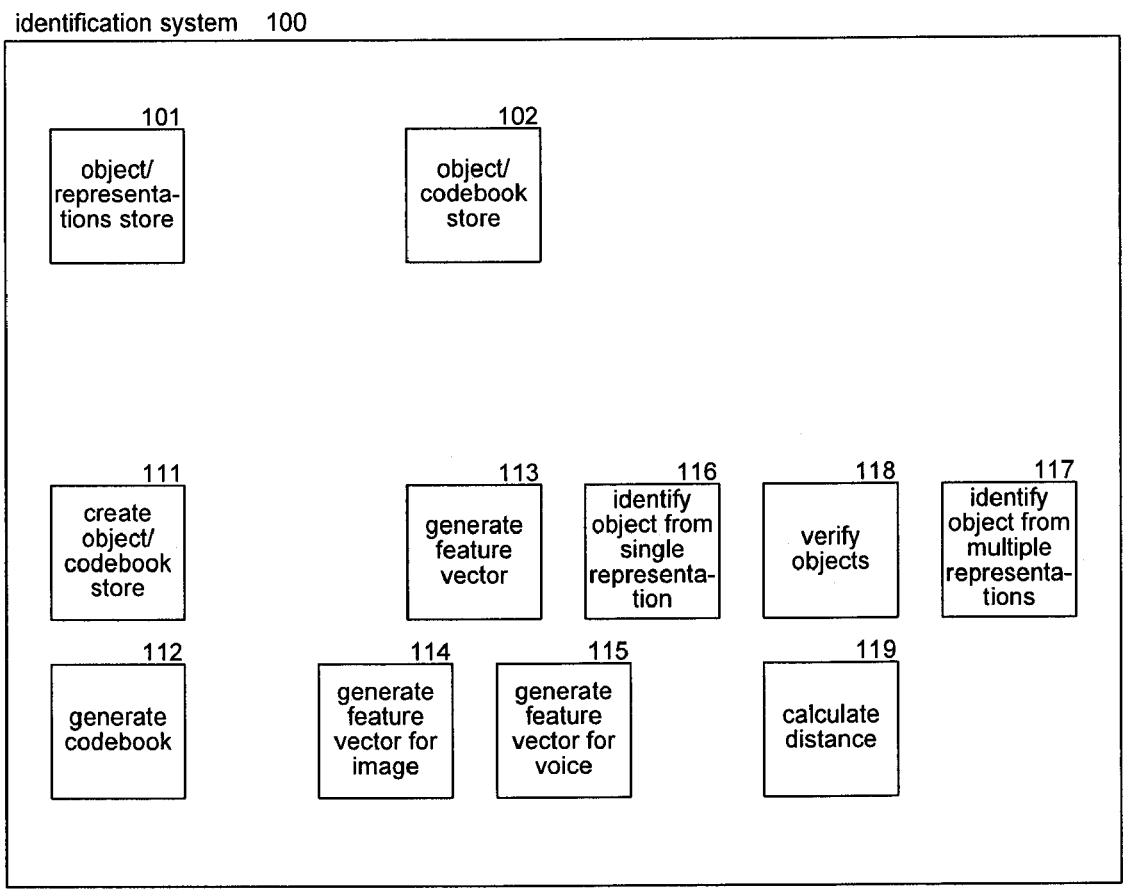
FIG. 1 is a block diagram that illustrates components of the identification system in one embodiment.

A method and system for identifying an object from multiple representations of the object is provided. For example, an identification system may identify a person from multiple images or voice samples of that person. In one embodiment, an identification system identifies objects based on a collection of representations of known objects. To facilitate the identification of objects, the identification system generates a mapping for each known object from that object to a codebook derived from the representation of the object. When faces are being recognized, the collection may contain multiple images of each known person at different profiles. The image with different profiles may be collected using multiple cameras or a single camera with the person at different poses. To generate a codebook for an object, the identification system generates a feature vector representing each representation of that object. A feature vector contains features (e.g., 15 features) that collectively represent the object. The identification system then generates a codebook for the object, which is a compressed representation of the feature vectors for that object. For example, if there are 50 images of each person, the identification system would generate 50 feature vectors for each person where each feature vector may 15 dimensions or features. A codebook, in contrast, may have 10 code vectors with 15 dimensions or features each. A codebook can be considered to be a unique signature of the object.

The identification system uses the mappings of known objects to identify the object corresponding to multiple input representations. For example, the identification system, when presented with multiple images of a person, identifies the person from the mappings. To identify the object, the identification system generates an input feature vector for each input representation. The identification system then accumulates for each known object the distances between the codebook of the object and each of the input feature vectors. The distance between a codebook and a feature vector is the minimum of the distances between the code vectors of the codebook and the feature vector. For example, to calculate the distance between the codebook of a person and an input feature vector for an input image, the identification system calculates the distance between each code vector of the codebook and the input feature vector and selects the minimum of those distances. To accumulate the distances for a person, the identification system calculates the distance between the codebook for the person and each of the input vectors and adds those distances together. The identification system then selects the object with the smallest accumulated distance. If the accumulated distance of that selected object satisfies an identification criterion, then the identification system identifies that object as corresponding to the input representations. For example, the identification system identifies the person with the smallest accumulated distance and determines whether that accumulated distance satisfies the identification criterion. The identification criterion may be a threshold difference between the smallest accumulated distance and the second smallest accumulated distance. In this way, the identification system can identify an object from multiple input representations of the object with greater accuracy and less complexity than prior systems.

In one embodiment, the identification system verifies that an input representation corresponds to an input object. For example, the identification system may verify that an input image of an input person, John Doe, really does correspond to that input person. As described above, the identification system may have a mapping from known objects to codebooks representing those known objects. The identification system generates an input feature vector for the input representation. For example, the identification system generates an input feature vector from an input image. The identification system then sets a target distance to the distance between the input feature vector and the codebook for the input object. For example, the identification system retrieves the codebook for the input person, John Doe, and calculates the distance between the input feature vector and the codebook of that target person. The identification system then calculates for each other object the distance between the codebook for that object and the input feature vector. The identification system then determines whether the target distance and the minimum of the distances for the other objects (a non-target distance) satisfies a verification criterion. If so, the identification system indicates that the input object can be verified as corresponding to the input representation. For example, the verification criterion may be whether the ratio of the target distance and the non-target distance is less than a threshold ratio. In this way, the identification system can verify that an input representation corresponds to an input object with greater accuracy and less complexity than prior systems.

In one embodiment, the identification system generates a codebook for face recognition from sequences of images of a person. The images can be still images or frames of a video. The images may be represented as $\{X_1, X_2, \ldots, X_M\}$ where M is the number of images. The identification system initially preprocesses the images to generate normalized images. To preprocess the images of a person, the identification system identifies the region of interest of each image that contains the face. The identification may use various well-known techniques for locating faces within an image. The identification may track the fact contours and use vertical and horizontal projections to bound the region of interest. The identification system then converts the images to gray scale images. The identification system then normalizes the size of the region of interest of each image. For example, the image size may be normalized to 136 pixels by 120 pixels. The result will be normalized images $\{I_1, I_2, \ldots, I_M\}$. The identification system may also perform a histogram-equalization on the normalized image.

The identification system then generates a feature vector for each of the normalized images. To generate the feature vector for an image, the identification system applies a 2-D discrete cosine transform ("DCT") to the normalized image to generate a transform matrix. The identification system then selects the coefficients from the upper left of the transform matrix as the features of the feature vector for the image. For example, the identification system may select of square submatrix of the transform matrix. Since the upper left coefficient of the transform matrix is a DC coefficient, the identification system excludes that coefficient from the feature vector, which tends to filter out illumination variations. If the submatrix is an m-by-m matrix, the feature vector will have K features where $K=(m^2-1)$. For example, if m is 4, then a feature vector will have 15 features. The identification system may use other techniques to generate the feature vectors of the images include wavelets, principal component analysis, linear discriment analysis, independent component analysis, Garber transforms and so on.

The identification system then generates the codebook for each person from the feature vectors of that person. The identification system uses a vector quantization technique such as the LBG algorithm developed by Linde, Buzo, and Gray or a K-Means clustering algorithm. The identification system represents the code book of a as person as follows:

$$CB_i = [C_{i1}, C_{i2}, \ldots, C_{iN}]$$

where i represents person i, N represents the number of code vectors of the codebook, and each $C_{ij}$ is an K-dimensional code vector.

The identification system identify a person from a single image or from multiple images (e.g., a video) or verify whether the person in an image is the person as purported. To identify a person from a single input image X, the identification generates an input feature vector F from the input image. The identification system then calculates the distance between each code vector of each person's codebook and the input feature vector. The distance is represented as follows:

$$D_{ij} = \|F - C_{ij}\|^2$$

where $D_{ij}$ represents the distance between the input feature vector and code vector j of the codebook for person i. The distance $D_i$ between the input feature vector and the code for person i is the smallest of the distances $D_{ij}$. The identification system identifies the person in the input image as being the person who has the smallest of the distances $D_i$.

To identify a person from multiple input images $X_1$, $X_2, \ldots X_M$, the identification system generates an feature vector $F_1, F_2, \ldots F_M$ or each input image. The identification system accumulates for each person the distances between each of the input feature vectors and that person's codebook represented as follows:

$$A_i = \sum_{k=1}^{M} \min_{\forall j}(\|F_k - CB_{ij}\|^2)$$

where $A_i$ represents the accumulated distance for person i. The identification system then selects the smallest accumulated distance $A_j$ and the next smallest accumulated distance $A_m$. The identification determines whether the accumulated distances $A_j$ and $A_m$ satisfy an identification criterion. The identification criterion may be a confidence measure based on the difference between the two selected accumulated distances represented as follows:

$$\beta_j = (A_j - A_m)$$

where $\beta_j$ represents the confidence measure. If the confidence measure $\beta_j$ is greater than an identification threshold $T_j$ for person j, then the identification system identifies the person in the input images as being person j. The identification system may calculate the identification threshold $T_j$ for person j by generating a histogram of the confidence measures $\beta_j$ for person j from the collection of persons and images and then setting the identification threshold $T_j$ based on the mean value of the histogram (e.g., a small percentage of the mean value). The identification system may generate the histogram for the person j by calculating the minimum distance between each feature vector derived from an image of person j and the codebooks of the other persons. One skilled in the art will appreciate that the identification threshold can be calculated in different ways and that other identification criteria may be used. For example, the identification criterion may be based on difference between the smallest accumulated distance and an average of the other accumulated distances.

To verify that an input person k is the person in an input image X, the identification system generates the input feature vector F from the input image. The identification system then calculates the distance $D_i$ between the feature vector F and the codebook for each person i. The identification system then determines whether distance $D_k$ satisfies a verification criterion. To determine whether $D_k$ satisfies the verification criterion, the identification system calculates a confidence measure λ representing that the input person k is the person in the input image X. The confidence measure may be represented by the following equation:

$$\lambda = \frac{D_k}{\min_{\forall i \neq k}(D_i)}$$

If the confidence measure is less than a verification threshold, then the identification system verifies that the input person is the person in the input image. Otherwise, the identification system indicates that it cannot make such a verification. The identification system may establish the verification threshold based on analysis of the images in the collection. One skilled in the art will appreciate that other verification criteria may be user. For example, the identification system may use a verification criterion that is based on a ratio of the squares of the distances.

FIG. 1 is a block diagram that illustrates components of the identification system in one embodiment. The identification system 100 includes an object/representations store 101 and an object/codebook store 102. The objects/representations store contains an entry for each object (e.g., person) that includes each a representation (e.g., image) of that object in the collection. Each object may have a varying number of representations. For example, one person may have 20 images, and another person may have 50 images. The object/codebook store contains an entry for each object along with the codebook for that object generated from the object/representation store. The identification system also includes a create object/codebook store component 111, a generate codebook component 112, and a generate feature vector component 113. The create object/codebook store component creates the codebooks for the objects of the object/representations store by invoking the generate codebook component. The generate codebook component invokes the generate feature vector component to generate the feature vectors from which the codebooks are generated. The generating of the feature vectors would typically be tailored to the type of object being processed by the identification system. For example, the identification system may include a generate feature vector for image component 114 and a generate feature vector for voice component 115 to generate feature vectors for images and voices, respectively. The identification system may also include an identify object from single representation component 116, an identify object from multiple representations component 117, a verify object component 118, and a calculate distance component 119. The identify object from single representation component is provided and input representation (e.g., image) and identifies the object that corresponds to that single representation. The identify object from multiple representations component identifies the object that corresponds to the multiple input representations (e.g., video frames) of that object. The verify object component verifies whether an input object corresponds to the object of an input representation. The calculate distance component calculates the distance between a feature vector and a codebook.

The computing devices on which the identification system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the identification system. In addition, the data structures and message structures may be stored or transmitted via a data transmission medium, such as a signal on a communications link. Various communications links may be used, such as the Internet, a local area network, a wide area network, or a point-to-point dial-up connection, to connect the identification system to other devices (e.g., web servers and user computing devices).

The identification system may be used in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The identification system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the creation of the object/codebook store can be performed on a computing system different from the computing system that performs the identification and verification using the object/codebook store.

Figure 2:
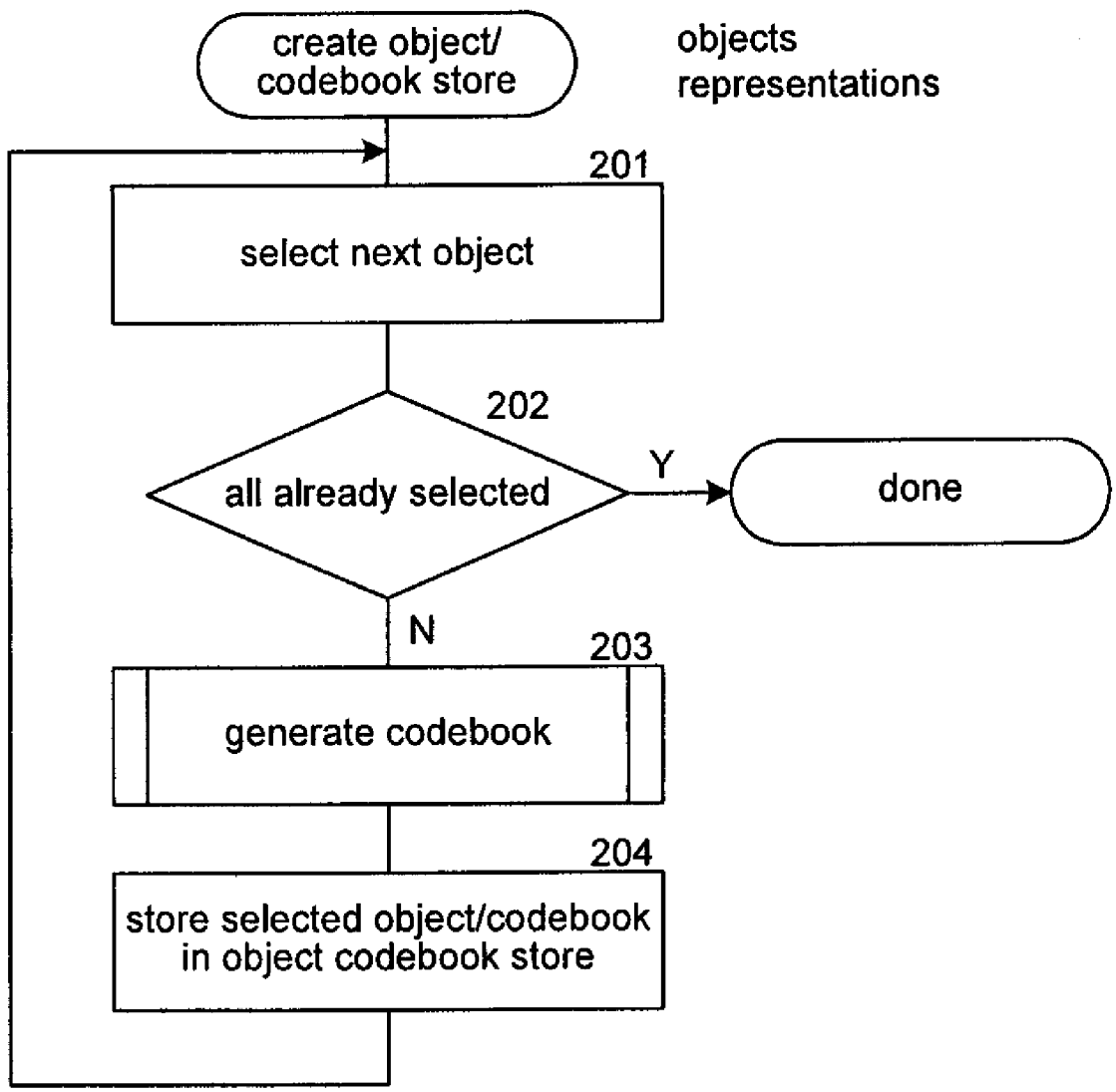
FIG. 2 is a flow diagram that illustrates the processing of the create object/codebook store component of the identification system in one embodiment.

FIG. 2 is a flow diagram that illustrates the processing of the create object/codebook store component of the identification system in one embodiment. The component is passed objects and their corresponding representations and generates a codebook for each object from its representations and stores a mapping of each object to its codebook in the object/codebook store. In blocks 201-204, the component loops selecting each passed object. In block 201, the component selects the next passed object. In decision block 202, if all the passed objects have already been selected, then the component completes, else the component continues at block 203. In block 203, the component invokes the generate codebook component to a generate codebook for the selected object. In block 204, the component stores a mapping of the selected object to its codebook in the object/codebook store and then loops to block 201 to select the next passed object.

Figure 3:
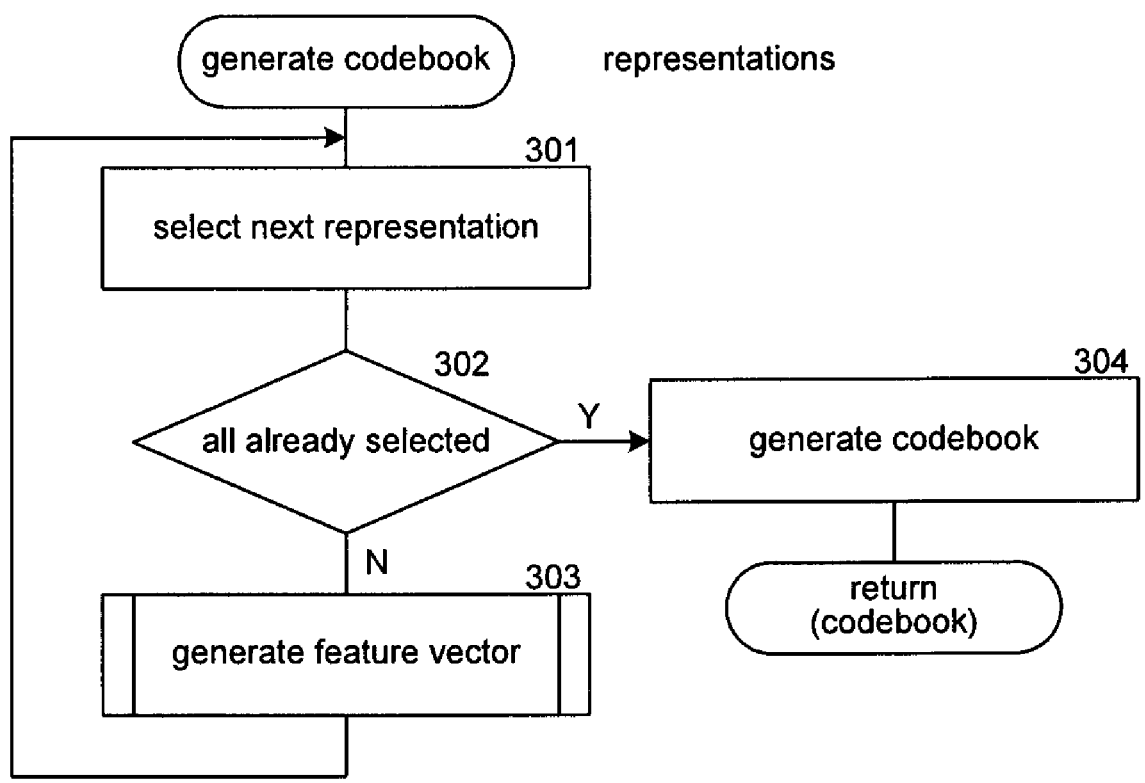
FIG. 3 is a flow diagram that illustrates the processing of the generate codebook component of the identification system in one embodiment.

FIG. 3 is a flow diagram that illustrates the processing of the generate codebook component of the identification system in one embodiment. The component is passed representations of an object and generates the codebook corresponding to those representations. In blocks 301-303, the component loops generating a feature vector for each representation. In block 301, the component selects the next representation. In decision block 302, if all the representations have already been selected, then the component continues at block 304, else the component continues at block 303. In block 303, the component invokes the generate feature vector component to generate a feature vector for the selected representation. The component then loops to block 301 to select the next representation. In block 304, the component generates the codebook corresponding to the generated feature vectors, for example, using an LBG-based technique. The component then returns the generated codebook.

Figure 4:
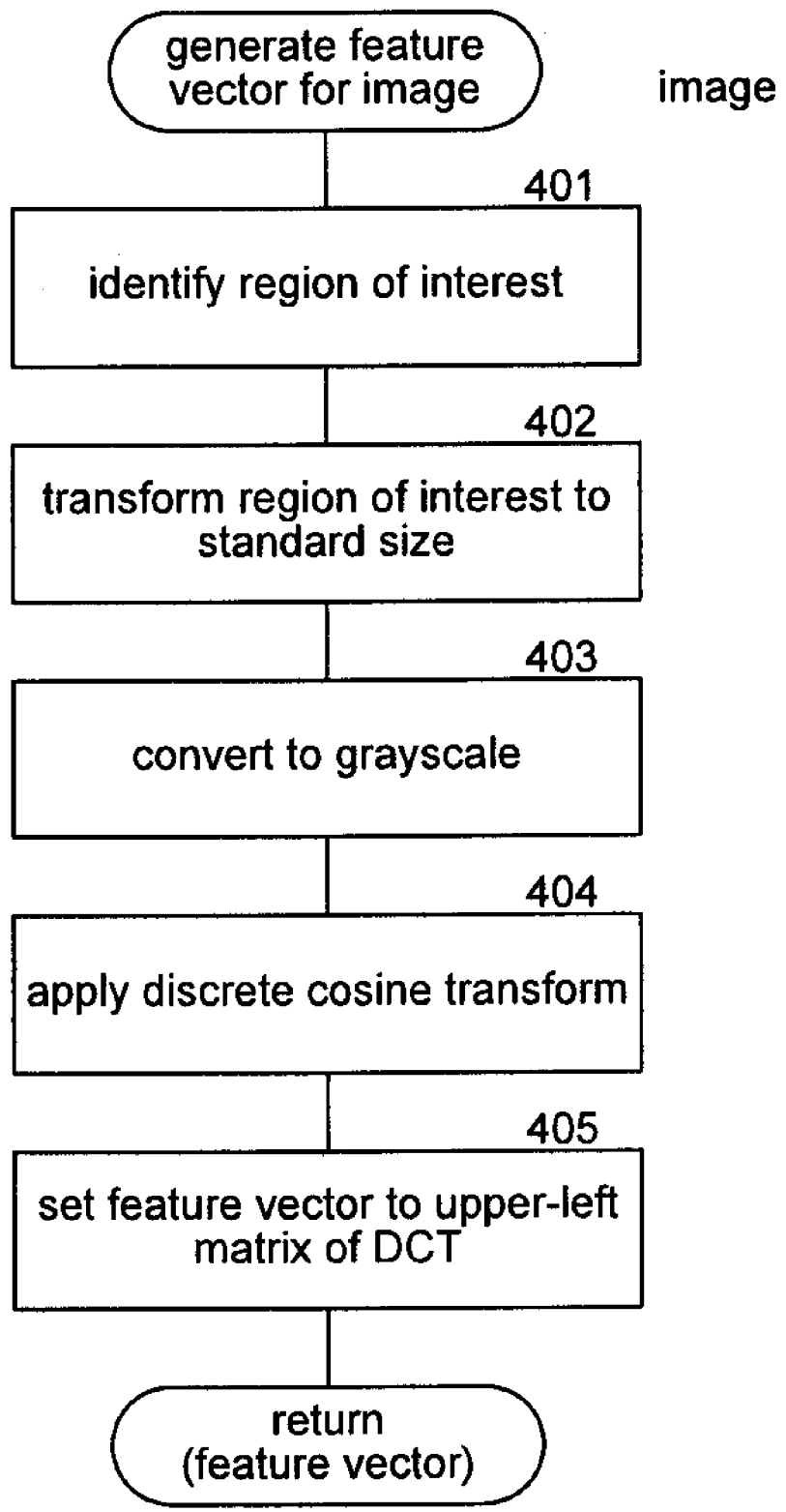
FIG. 4 is a flow diagram that illustrates the processing of the generate feature vector for image component of the identification system in one embodiment.

FIG. 4 is a flow diagram that illustrates the processing of the generate feature vector for image component of the identification system in one embodiment. The component is passed an image and generates a feature vector for the image. In block 401, the component identifies a region of interest of the image that includes the face of the person represented by the image. In block 402, the component transforms the region of interest into a standard size. In block 403, the component converts the standard size image to a gray scale image. In block 404, the component applies a discrete cosine transform to the standard size image to generate a transform matrix. In block 405, the component sets the feature vector to the upper left sub-matrix of the transform matrix without the first element of the sub-matrix. The component then returns the feature vector.

Figure 5:
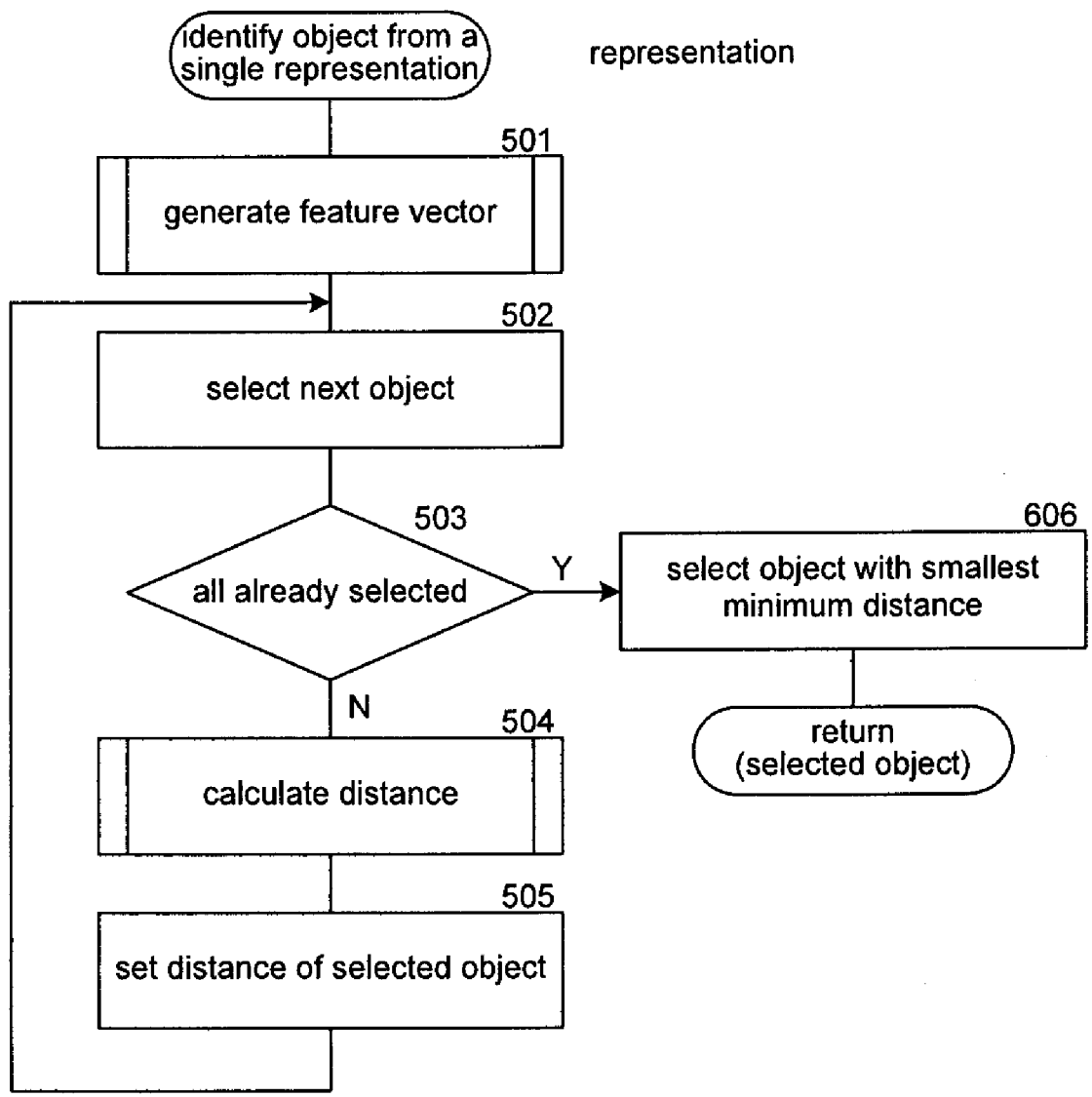
FIG. 5 is a flow diagram that illustrates the processing of the identify object from a single representation component of the identification system in one embodiment.

FIG. 5 is a flow diagram that illustrates the processing of the identify object from a single representation component of the identification system in one embodiment. The component is passed a representation and identifies the object that corresponds to that representation. In block 501, the component invokes the generate feature vector component to generate an input feature vector for the input representation. In blocks 502-505, the component loops calculating, for each object, the distance between the feature vector and the object's codebook. In block 502, the component selects the next object. In decision block 503, if all the objects have already been selected, then the component continues at block 506, else component continues at block 504. In block 504, the component invokes the calculate distance component to calculate the distance between the codebook for the selected object and the input feature vector. In block 505, the component sets the distance of the selected object to the calculated distance and then loops to block 502 to select the next object. In block 506, the component selects the object with the smallest distance and returns an indication that the selected object corresponds to the input representation.

Figure 6:
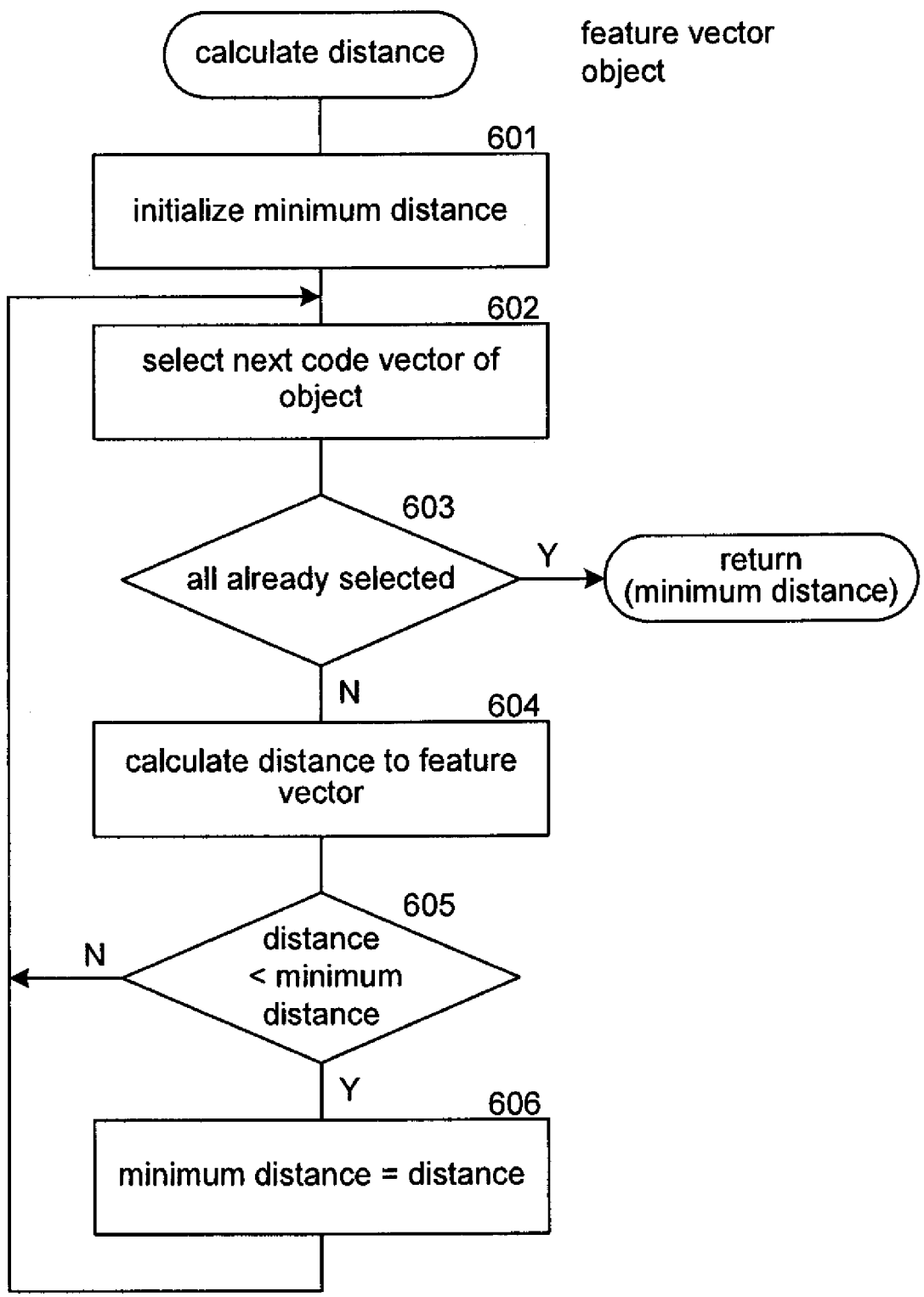
FIG. 6 is a flow diagram that illustrates the processing of the calculated minimum distance component of the identification system in one embodiment.

FIG. 6 is a flow diagram that illustrates the processing of the calculated minimum distance component of the identification system in one embodiment. The component is passed a feature vector and an object and calculates the distance between the feature vector and the codebook of the object as the minimum of the distances between the code vectors and the passed feature vector. In block 601, the component initializes the minimum distance to a very large value. In block 602, the component selects the next code vector of the object's codebook. In decision block 603, if all the code vectors of the codebook of the selected object have already been selected, then the component returns the value of the minimum distance as the distance, else the component continues at block 604. In block 604, the component calculates the distance between the feature vector and the selected code vector. In decision block 605, if the calculated distance is less than the minimum distance calculated so far, then the component continues at block 606, else the component loops to block 602 to select the next code vector of the object. In block 606, the component sets the minimum distance to the calculated distance and then loops to block 602 to select the next code vector for the object.

Figure 7:
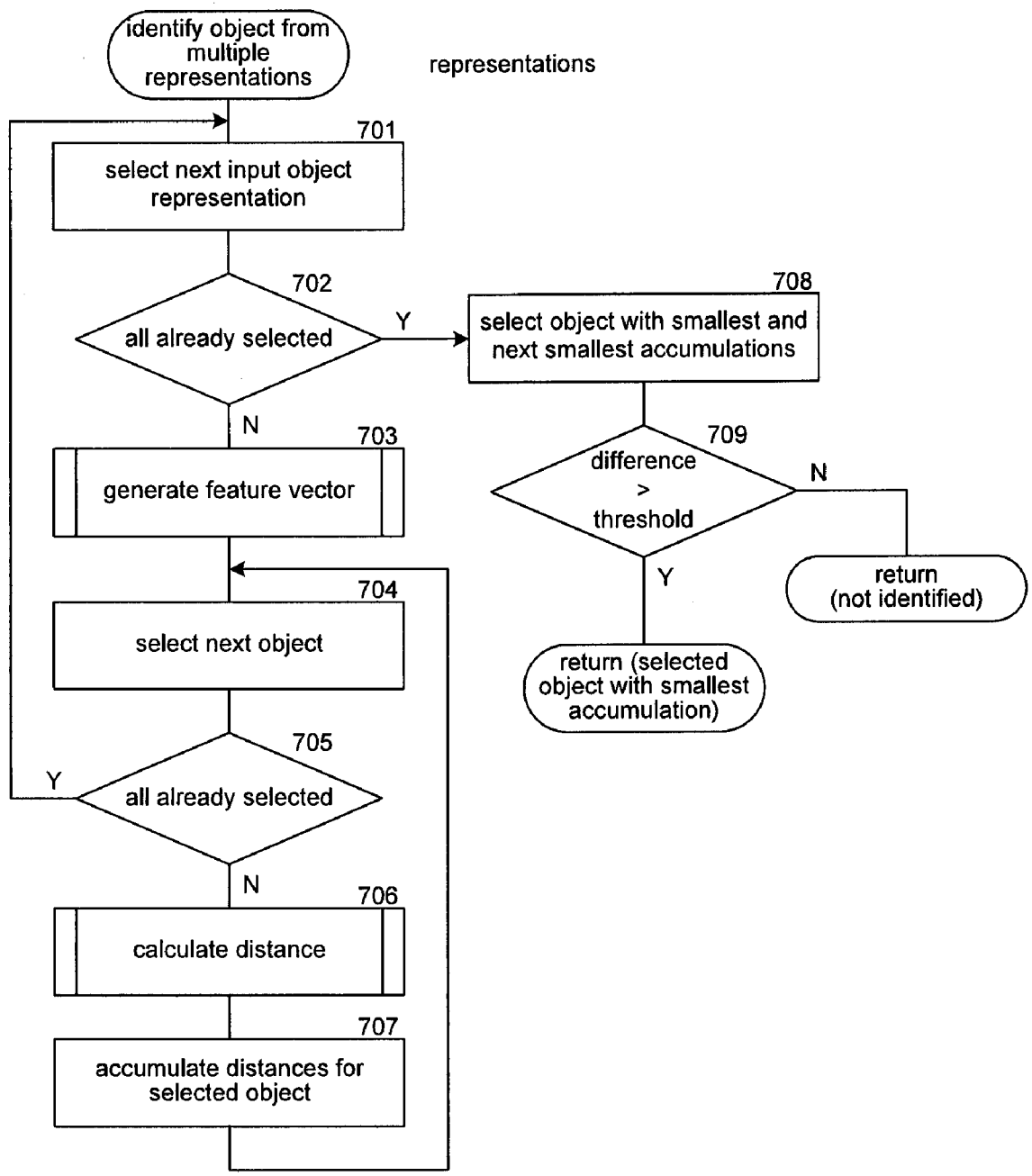
FIG. 7 is a flow diagram that illustrates the processing of the identify objects from multiple representations component of the identification system in one embodiment.

FIG. 7 is a flow diagram that illustrates the processing of the identify objects from multiple representations component of the identification system in one embodiment. The component is passed multiple representations and identifies an object that corresponds to those representations. In block 701, the component selects the next representation. In decision block 702, if all the representations have already been selected, then the component continues at block 708, else the component continues at block 703. In block 703, the component invokes the generate feature vector component to generate a feature vector for the selected representation. In blocks 704-707, the component loops accumulating be distances between the codebooks for the objects and the selected representation. In block 704, the component selects the next object. In decision block 705, if all the objects have already been selected, then the component loops to block 701 to select the next representation, else the component continues at block 706. In block 706, then the component invokes the calculate distance component to calculate the distance between the feature vector of the selected representation and the codebook of the selected object. In block 707, the component adds that distance to the accumulated distance for the selected object and loops to block 704 to select the next object. In block 708, the component selects the object with the smallest and the next smallest accumulations. In decision block 709, if the difference between the selected accumulations is greater than a threshold amount, then the component returns the selected object with the smallest accumulation as corresponding to the representations, else the component returns an indication that it could not identify a corresponding object.

Figure 8:
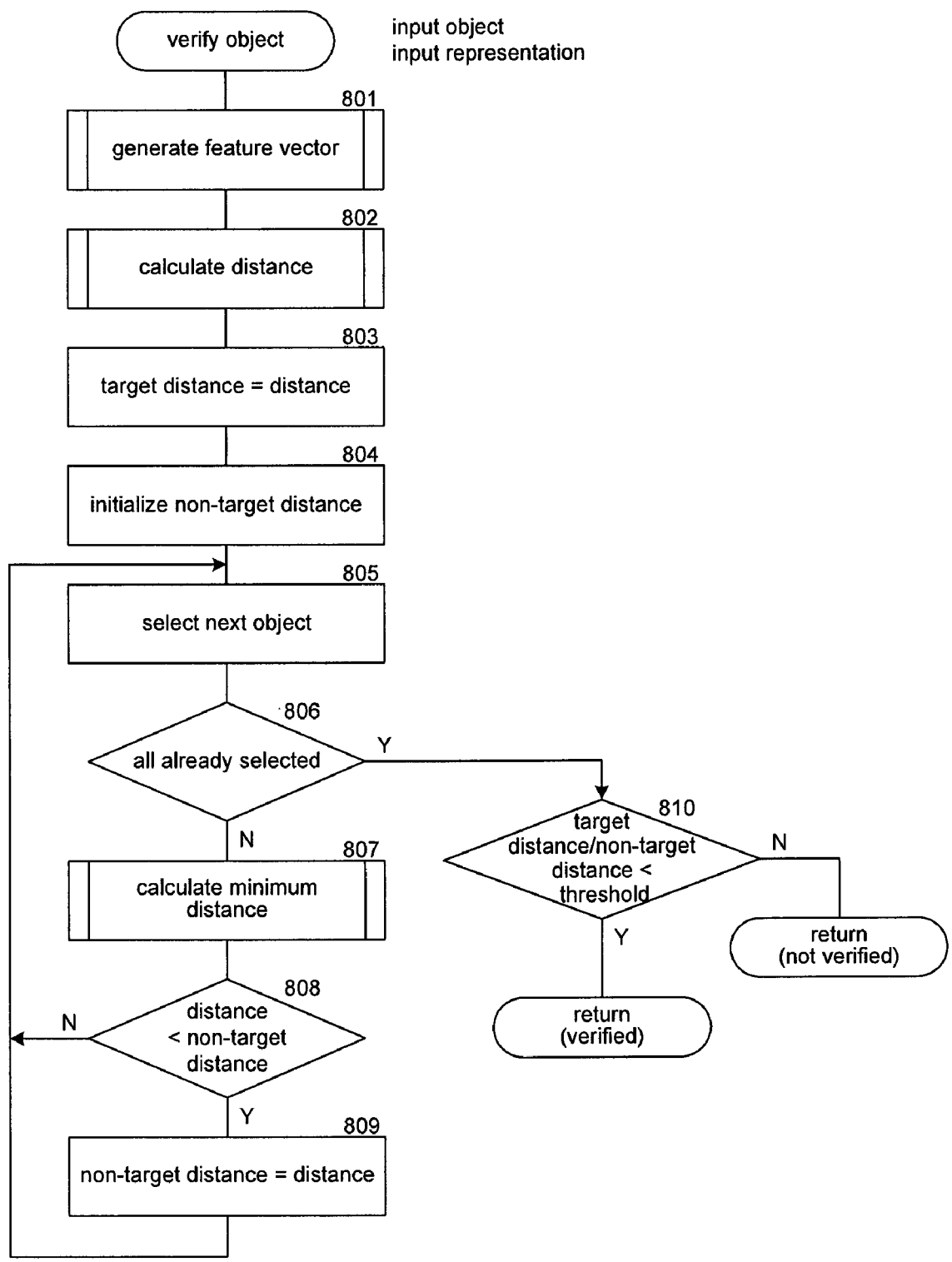
FIG. 8 is a flow diagram that illustrates the processing of the verify object component of the identification system in one embodiment.

FIG. 8 is a flow diagram that illustrates the processing of the verify object component of the identification system in one embodiment. The component is passed an input representation and an input object and verifies whether the object corresponds to the object representation. In block 801, the component generates an input feature vector for the input representation. In block 802, the component invokes a calculate distance component to calculate the distance between the input feature vector and the codebook for the input object. In block 803, the component sets a target distance to the calculated distance. In blocks 804-809, the component loops identifying the distance between the feature vector for the input representation and the codebook of each object other than the input object. In block 804, the component initializes a non-target distance to large value. In block 805, the component selects the next object other than the input object. In decision block 806, if all such objects have already been selected, then the component continues at block 810, else the component continues at block 807. In block 807, the component invokes a calculate distance component to calculate the distance between the input feature vector and the codebook for the selected object. In decision block 808, if the calculated distance is less then the current non-target distance, then the component continues at block 809, else the component loops to block 805 to select the next object. In block 809, the component sets the non-target distance to the calculated distance and then loops to block 805 to select the next object. In block 810, if the ratio of the target distance to the non-target distance is less than a threshold ratio, then the component returns an indication that the input object has been verified as corresponding to the input representation, else the component returns an indication that such a verification could not be made.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I claim:

1. A computer system for identifying a target person from multiple input images of the target person, comprising:
for each of a plurality of known persons, a mapping from the person to a codebook derived from feature vectors of the person, each feature vector of the person being derived from an image of the person;
a memory storing computer-executable instructions of:
a component that generates an input feature vector for each of the multiple input images of the target person;
a component that for each known person accumulates the distances between the codebook for the person and each of the input feature vectors of the target person; and
a component that, when the minimum of the accumulated distances satisfies an identification criterion, identifies the target person as the known person with the minimum of the accumulated distances; and
a processor that executes the computer-executable instructions stored in the memory.

2. The computer system of claim 1 including:
a component that, when the minimum of the accumulated distances does not satisfy the identification criterion, indicates that the target person cannot be identified.

3. The computer system of claim 1 wherein the identification criterion is a threshold distance between the minimum of the accumulated distances and the next larger of the accumulated distance.

4. The computer system of claim 3 wherein the threshold distance for a known person is derived from analysis of the images of the known person.

5. The computer system of claim 1 wherein the distance between the input feature vector and a codebook is the minimum of the distances between the input feature vector and each code vector of the codebook.

6. The computer system of claim 1 wherein the codebook for a known person is derived from the feature vectors of the known person using vector quantization.

7. The computer system of claim 6 wherein the vector quantization is based on a Linde, Buzo, and Gray algorithm.

8. The computer system of claim 1 wherein the images of a known person represent different profiles of that known person.

9. The computer system of claim 1 wherein the feature vector of an image is derived from a discrete cosine transform of the image.

10. The computer system of claim 9 wherein the feature vector excludes the DC coefficient of the image.

11. A computer system for identifying a target person from multiple input images of the target person, comprising:
for each of a plurality of known persons, a mapping from the person to a codebook derived from feature vectors of the person, each feature vector of the person being derived from an image of the person;
a memory storing computer-executable instructions of:
a component that generates an input feature vector for each of the multiple input images of the target person;

a component that for each known person accumulates the distances between the codebook for the person and each of the input feature vectors of the target person; and a component that, when the minimum of the accumulated distances satisfies an identification criterion, identifies the target person as the known person with the minimum of the accumulated distances; and a processor that executes the computer-executable instructions stored in the memory, wherein the identification criterion is a threshold distance between the minimum of the accumulated distances and the next larger of the accumulated distance, wherein the threshold distance for a known person is derived from analysis of the images of the known person, and wherein the analysis is based on a histogram of distances from feature vectors of images of the known person to the codebooks of the other known person.

12. A computer-readable storage device storing computer-executable instructions for controlling a computing device to verify whether a target image is of a purported person, by a method comprising:

providing, for each of a plurality of persons including the purported person, a mapping from the person to a codebook derived from feature vectors of the person, each feature vector of a person being derived from an image of the person;

receiving the target image;

receiving an indication purported person;

generating a target feature vector for the target image;

calculating by the computing device a target distance between the codebook for the purported person and the target feature vector;

for each of a plurality of persons other than the purported person, calculating a non-target distance between the codebook for that person and the target feature vector;

selecting a minimum distance of the non-target distances; and when the target distance and the minimum distance satisfy a verification criterion, indicating that the target image is verified as being of the purported person.

13. The computer-readable storage device of claim 12 wherein the verification criterion is a threshold ratio of the target distance and the minimum distance.

14. The computer-readable storage device of claim 13 wherein the threshold ratio is based on a square of the target distance and the minimum distance.

15. A computer-readable storage device storing computer-executable instructions for controlling a computing device to identify a target object of a target image, by a method comprising:

providing, for each of a plurality of known objects, a mapping from the object to a codebook derived from feature vectors of the object, each feature vector of the object being derived from an image of the object;

generating a target feature vector the target image;

for each known object, calculating a distance between the codebook for that known object and the target feature vector of the target image;

identifying the known object with the smallest calculated distance;

generating an identification threshold by, for each known object other than the identified known object, calculating a confidence measure for the identified known object based on comparison of the distance for the identified known object and the distance for that known object;

generating a histogram of the confidence measures; and setting the identification threshold based on the generated histogram; and when the distance of the identified known object satisfies the generated identification threshold, indicating that the target image is an image of the identified known object.

16. The computer-readable storage device of claim 15 wherein the identification threshold is set to a mean distance of the histogram.

17. The computer-readable storage device of claim 15 wherein the confidence measure is based on difference between distance of the identified known object and that known object.

18. The computer-readable storage device of claim 15 wherein the object is a person.

19. The computer-readable storage device of claim 15 wherein the indication that that target image is an image of the identified known object is based on analysis of a plurality of target images of the target object.

20. The computer-readable storage device of claim 19 wherein the confidence measure is based on accumulated distances for the target images.

* * * * *